United States Patent [19]

Maida

[11] 4,294,525
[45] Oct. 13, 1981

[54] CAMERA HAVING A DIGITAL EXPOSURE VALUE DISPLAY DEVICE

[75] Inventor: Osamu Maida, Tokyo, Japan

[73] Assignee: Nippon Kogaku K.K., Tokyo, Japan

[21] Appl. No.: 196,358

[22] Filed: Oct. 14, 1980

[30] Foreign Application Priority Data

Oct. 20, 1979 [JP] Japan .................................. 54-135507

[51] Int. Cl.³ .......................... G03B 7/091; G03B 9/62; G03B 17/18
[52] U.S. Cl. .................................. 354/23 D; 354/50; 354/60 L; 354/234; 354/289
[58] Field of Search .................... 354/23 D, 50, 51, 53, 354/60 L, 234, 235, 289

[56] References Cited

U.S. PATENT DOCUMENTS

| | | | |
|---|---|---|---|
| 3,959,791 | 5/1976 | Takahashi et al. | 340/324 R |
| 4,051,491 | 9/1977 | Toyoda | 354/60 L |
| 4,072,962 | 2/1978 | Maida | 354/24 |
| 4,129,366 | 12/1978 | Watanabe | 354/60 L X |

Primary Examiner—Michael L. Gellner
Attorney, Agent, or Firm—Shapiro and Shapiro

[57] ABSTRACT

A camera has a digital exposure display device and a digital fixed point match type exposure display device. The digital exposure display device compares a voltage associated with an exposure value such as a shutter time value or an aperture value obtained from exposure operating means with a plurality of reference voltages produced by a reference voltage generating circuit and thereby converts the exposure value into a digital signal and digitally displays the exposure value on the basis of said digital signal. The digital fixed point match type exposure display device comprises an exposure value setting circuit for generating a voltage associated with a manually set exposure value, differential amplifier circuit means for producing a voltage including a voltage corresponding to the difference between the voltage of the exposure value setting circuit and the voltage obtained from the exposure operating means, forming means for forming a first comparison voltage and a second comparison voltage greater than the first comparison voltage by using the output voltage of the reference voltage generating circuit, comparing means for comparing the comparison voltage of the forming means with the output of the differential circuit means and generating a first signal variable in condition depending on whether said output is smaller or greater than the first comparison voltage and a second signal variable in condition depending on whether said output is greater or smaller than the second comparison voltage, and display means operative to effect a display based on the first and second signals of the comparing means.

9 Claims, 10 Drawing Figures

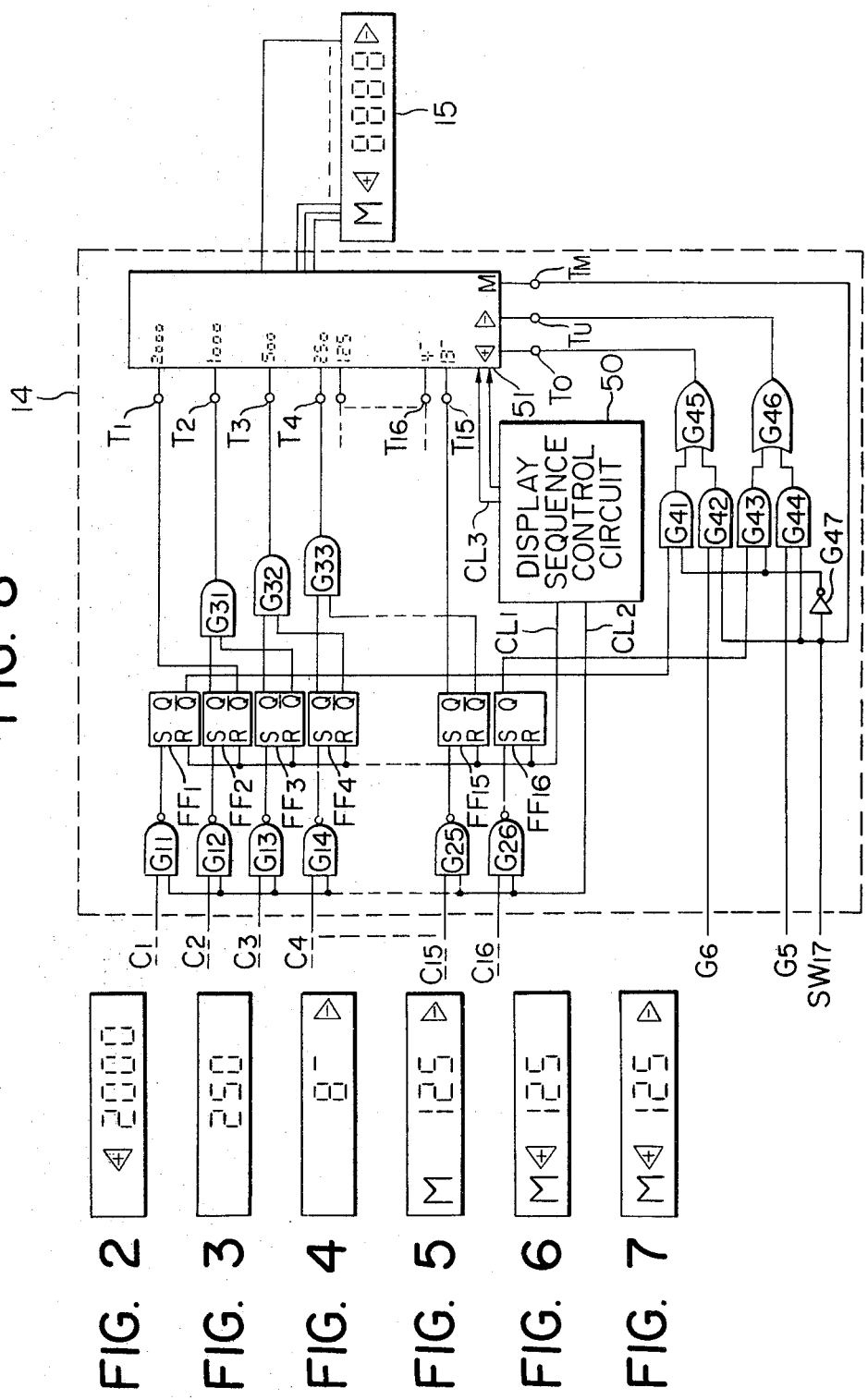

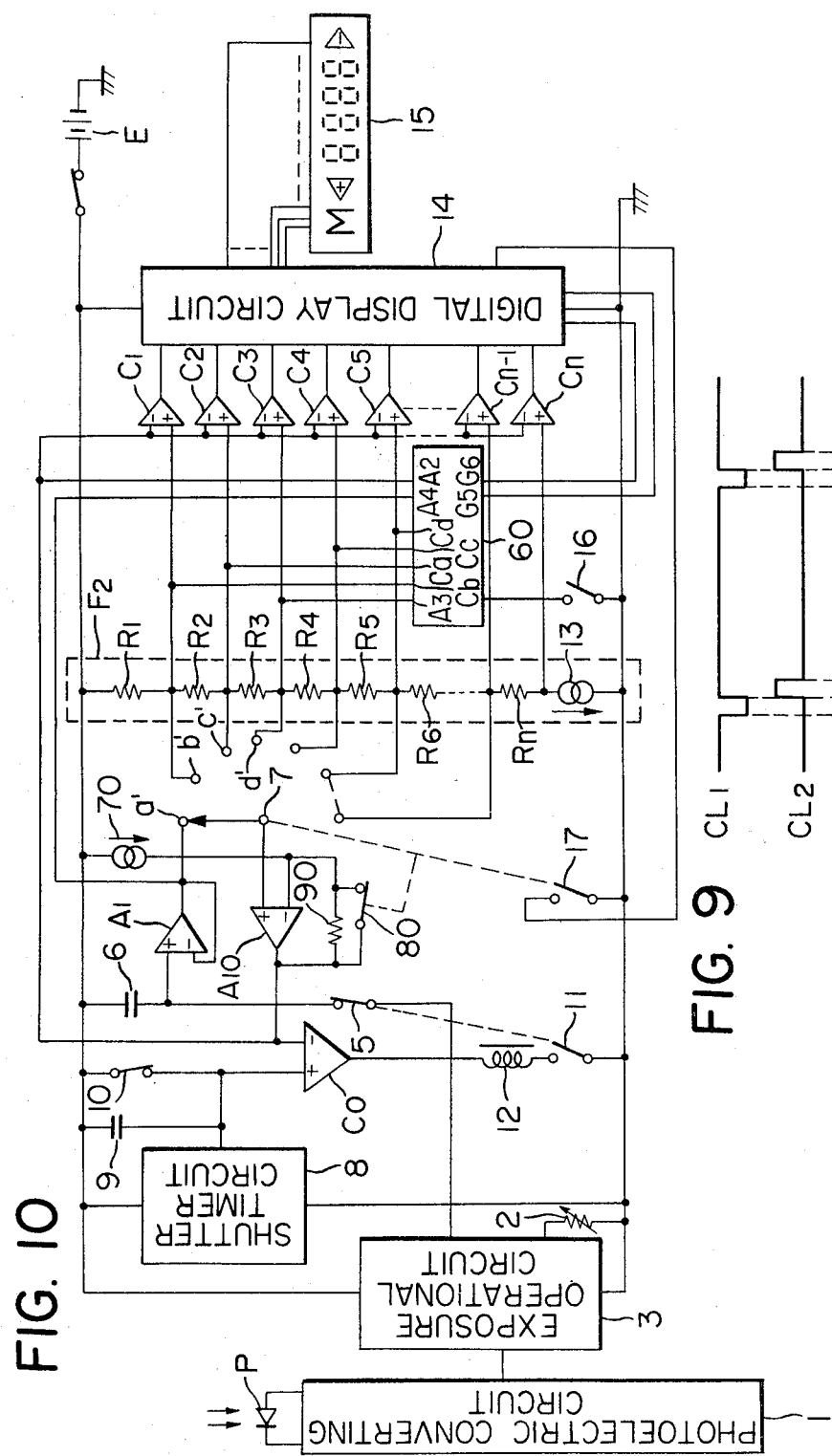

CAMERA HAVING A DIGITAL EXPOSURE VALUE DISPLAY DEVICE

BACKGROUND OF THE INVENTION

1. Field of the Invention

This invention relates to a camera having a digital exposure value display device.

2. Description of the Prior Art

A digital exposure value display device for displaying a manually set or automatically controlled shutter time value or aperture value as a digital value in the viewfinder of a camera is known. Such digital exposure value display device requires a highly accurate reference voltage generating circuit for generating a number of reference voltages of different levels to quantize a voltage associated with the exposure value to be displayed.

Also known is a digital fixed point match type exposure display device for digitally displaying whether a manually set shutter time or aperture value provides a proper exposure or an under-exposure or an over-exposure, by the use of a plurality of display elements such as lamps or the like. This has, for example, three LEDs (light emitting diodes) and displays the proper exposure by the turn-on of a first LED, the under-exposure by the turn-on of a second LED, and the over-exposure by the turn-on of a third LED. Such digital fixed point match type exposure display device also compares a voltage representing a manually set exposure value with a plurality of reference voltages and necessarily requires a highly accurate reference voltage generating circuit.

Therefore, a camera provided with both the digital exposure value display device and the digital fixed point match type exposure display device requires two highly accurate reference voltage generating circuits and this results in a high cost of the camera.

Also, a camera which permits selection of automatic exposure setting and manual exposure setting requires a reference voltage generating circuit for an exposure value display device which displays an automatically controlled shutter time or aperture value as a digital value in the viewfinder of the camera, and a reference voltage generating circuit for generating a voltage corresponding to a set value provided by rotation of a shutter dial or the like. Again in the case, there is a disadvantage that two highly accurate reference voltage generating circuits are required.

SUMMARY OF THE INVENTION

It is an object of the present invention to provide a camera having a digital exposure value display device which is lower in cost of manufacture and yet has the same accuracy as the prior art cameras and moreover is simple in construction because the reference voltage generating circuit of the digital exposure value display device is used also as the reference voltage generating circuit of the digital fixed point match type exposure display device.

It is another object of the present invention to provide a camera which is lower in cost of manufacture and yet has the same accuracy as the prior art cameras and moreover is simple in construction because the reference voltage generating circuit for the digital exposure value display device is used also as the reference voltage generating circuit for the manual exposure setting.

The invention will become fully apparent from the following detailed description thereof taken in conjunction with the accompanying drawings.

BRIEF DESCRIPTION OF THE DRAWINGS

FIGS. 2 to 7 show the displays of the display device of FIG. 1.

FIG. 8 is a circuit diagram of a portion for changing over the display of the digital display circuit of FIG. 1.

FIG. 9 shows the timing of the reset pulse, sampling pulse and blanking pulse of $CL_1$, $CL_2$ and $CL_3$ of FIG. 8.

FIG. 10 is a circuit diagram of the aperture priority type automatic exposure single lens reflex camera according to another embodiment of the present invention.

DESCRIPTION OF THE PREFERRED EMBODIMENTS

Figure 1:
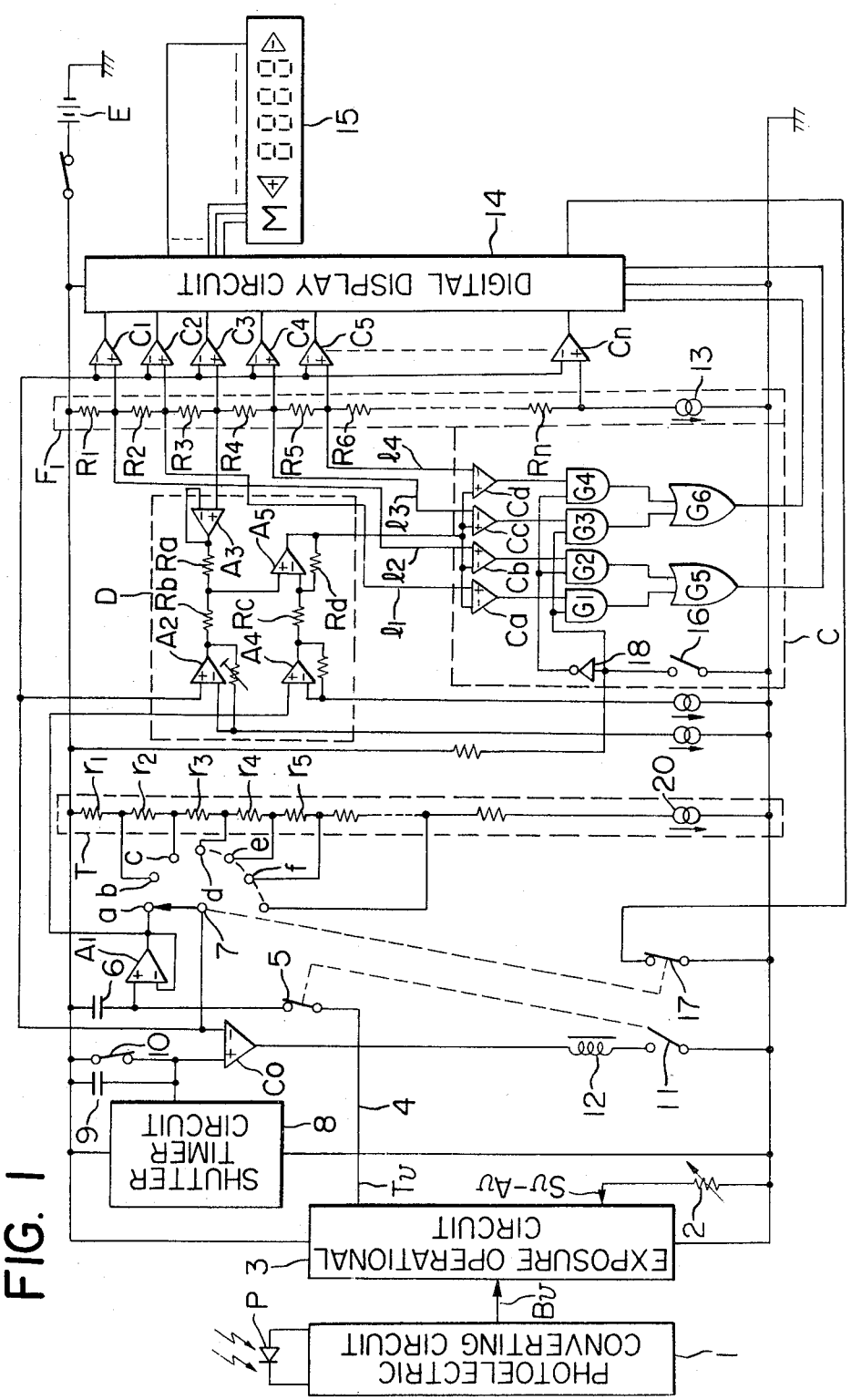
FIG. 1 is a circuit diagram of the aperture priority type automatic exposure single lens reflex camera according to an embodiment of the present invention.

FIG. 1 shows the circuit of the aperture priority type automatic exposure single lens reflex camera according to an embodiment of the present invention.

A photoelectric converting circuit 1 has a photodiode P which receives the object light passed through a phototaking lens, and produces an output proportional to the logarithm of the object brightness, namely, a luminance value Bv. A variable resistor 2 has its resistance value varied in accordance with the set film speed and the set aperture value, and generates the difference $Sv - Av$ between the logarithm of the film speed, namely, the ASA speed value Sv, and the logarithm of the aperture value, namely, the aperture value Av. An exposure operational circuit 3 produces a time value Tv which provides the logarithm of a proper shutter time, namely, a proper exposure, from the outputs of the photoelectric converting circuit 1 and the variable resistor 2.

The voltage of this time value Tv is produced to an output line 4 as the potential difference from the + side potential of a power source E. The output voltage of the exposure operational circuit 3 is transmitted through a memory switch 5 to a memory capacitor 6. The memory switch 5 is opened at the start of the exposure prior to the movement of a mirror for directing light to a viewfinder and the photodiode P. Accordingly, the voltage immediately before the memory switch 5 which prescribes the shutter time value is opened is memorized in the memory capacitor 6. The voltage of the memory capacitor 6 is connected to the automatic exposure terminal a of a shutter time change-over switch 7 through a follower amplifier $A_1$ of a high input impedance. An output voltage associated with the time value from a shutter time manual setting circuit T comprising serial resistors $r_1$, $r_2$, $r_3$, . . . and a constant current source 20 is imparted to the other terminals of the shutter time change-over switch 7, namely, manual shutter time selecting terminals b, c, d, . . . When the shutter time change-over switch 7 selects the terminal a, the automatic exposure mode takes place, and when the shutter time change-over switch 7 selects the terminals b, c, d, . . . , the manual exposure mode takes place. Voltages associated with the time value Tv of shutter times 1/2000 sec., 1/1000 sec/., 1/500 sec., . . . are generated at the terminals b, c, d, . . . The voltage selected by the shutter time change-over switch 7 is applied to one input of a comparator $C_o$, and the charging voltage of a capacitor 9 whose charging is adjusted by a shutter timer circuit 8 is applied to the other input of the comparator $C_o$. A trigger switch 10 is opened when the forward curtain of the shutter starts to move, whereby the capacitor 9 starts to be charged. The charging current of the shutter timer circuit 8 is adjusted so that the charging voltage of the capacitor 9 is proportional to the logarithm of the time lapse from the opening of the trigger switch 10. The operation thereof is such that before the aforementioned mirror starts to move upon depression of a shutter release button, not shown, the memory switch 5 is opened and substantially in synchronism therewith, a magnet energizing switch 11 is closed and at that time, the output of the comparator $C_o$ assumes H (high) level. Accordingly, a current flows to a magnet 12 for holding the rearward shutter curtain to energize this magnet 12, and the rearward shutter curtain is restrained by a rearward shutter curtain holding mechanism. When the movement of the mirror is completed and the forward shutter curtain starts to move, the trigger switch 10 is opened and the capacitor 9 starts to be charged by the shutter timer circuit 8. The charging voltage of the capacitor 9 proportional to the logarithm of time and the voltage selected by the shutter time change-over switch 7 are compared by the comparator $C_o$ and, when the charging voltage drops below the selected voltage, the output of the comparator $C_o$ changes to L (low) level and as a result, the magnet 12 is deenergized and the rearward shutter curtain is closed. Thereafter, the aforementioned mirror returns to its initial position, whereupon the memory switch 5 is again closed and the magnet energizing switch 11 becomes open. Such an operation sequence is well-known in single lens reflex cameras.

A reference voltage generating circuit $F_1$ comprising a plurality of series-connected resistors $R_1-R_n$ and a constant current source 13 produces a plurality of reference voltages to the junctions between the resistors. The differences between the reference voltages at the adjacent junctions are all constant, i.e., $\Delta V$. Each reference voltage is the potential difference from a voltage having the + side potential of the power source E as the reference, namely, the + side potential. The lowest reference voltage of the reference voltage generating circuit $F_1$, namely, the voltage intermediate of the voltage at the junction between the resistors $R_1$ and $R_2$ and the voltage at the junction between the resistors $R_2$ and $R_3$, corresponds to the time value $T_v$ of the highest controllable shutter time 1/2000 sec. of the shutter of this camera, and likewise, the highest reference voltage of the reference voltage generating circuit $F_1$, namely, the voltage intermediate of the lower end voltage of the resistor $R_n$ and the voltage at the junction between the resistors $R_n$ and $R_{n-1}$, corresponds to the time value $T_v$ of the lowest controllable shutter time, for example, 8 sec., of the shutter. A voltage representing the shutter time to be controlled, namely, the selected voltage selected by the shutter time change-over switch 7, is applied in common to one input terminal of each of comparators $C_1-C_n$, and said reference voltages are applied to the other input terminals of these comparators. A parallel comparison processing type A/D converter circuit is constituted by the reference voltage generating circuit $F_1$ and comparators $C_1-C_n$, and by the output of this converter circuit, a digital display circuit 14 is operated to drive a shutter time display device 15. This display circuit 14 has a segment decoder and a dynamic driving or a static driving circuit in accord with the characteristic of the display device and the division number of segments. A digital fixed point match type exposure display circuit for manual exposure setting is constituted by differential circuit means D comprising follower amplifiers $A_2$, $A_3$, $A_4$ and a differential amplifier $A_5$ including resistors $R_a$, $R_b$, $R_c$, $R_d$; comparing means C comprising comparators $C_a$, $C_b$, $C_c$, $C_d$, insensitive zone width change-over gates $G_1$, $G_2$, $G_3$, $G_4$, $G_5$, $G_6$, switch 16 and gate 18; forming means for applying a voltage from part of the reference voltage generating circuit $F_1$ to the comparing means C through lines 11-14; the display circuit 14; and the display device 15. The insensitive zone width during the fixed point match can be selected by an insensitive zone width change-over switch 16 which controls the gates $G_1-G_4$. A switch 17 is operatively associated with the shutter time change-over switch 7. When the switch 7 selects the automatic exposure terminal a, namely, during the automatic exposure mode, the switch 17 becomes closed. The close signal of the switch 17 is transmitted to the digital display circuit 14. The digital display circuit 14 neglects the output condition of the gates $G_5$, $G_6$ by the close signal of the switch 17 and also determines the display of the marks ◢ and ◣ of the display device 15 only by the conditions of the comparators $C_1-C_n$. At the same time, the digital display circuit 14 renders into erased condition the display of the mark M of the display device 15 which indicates the manual setting mode. With the shutter time change-over switch 7 having selected any other terminal than the terminal a, the switch 17 becomes open. When the switch 17 becomes open, the ditigal display circuit 14 determines the display of the marks ◢ and ◣ of the display device 15 by the outputs of comparators $C_a$, $C_b$, $C_c$ and $C_d$, namely, the outputs of the gates $G_5$ and $G_6$. At the same time, it displays the mark M and indicates the manual setting mode.

Operation will now be described.

First, in the case of the automatic exposure mode in which the shutter time is automatically controlled, the change-over switch 7 is connected to the terminal a and the switch 17 is closed. By the closing of the switch 17, the outputs of the gates $G_5$ and $G_6$ are neglected by the digital display circuit 14 and, in the display device 15, the mark M representing the manual setting of the shutter time disappears. When the proper shutter time output voltage of the exposure operational circuit 3 exceeds the highest controllable shutter time (1/2000 sec.) of the shutter, that voltage is smaller than the reference voltage at the junction between the resistors $R_1$ and $R_2$ (that is, the output potential of the exposure operational circuit 3 is higher than said reference potential) and therefore, the outputs of all of the comparators $C_1-C_n$ assume L level. In accordance with these L-level outputs, the display circuit 14 causes the display device 15 to display ◢◣ 2000 as shown in FIG. 2. This display shows that the proper shutter time is faster than 1/2000 sec. and a proper exposure cannot be obtained. Also, when the proper shutter time output voltage of the exposure operational circuit 3 corresponds to the shutter time of 1/250 sec., this voltage is a voltage between the reference voltages of the comparators $C_4$ and $C_5$ and so, the outputs of the comparators $C_1-C_4$ assume H (high) level and the outputs of the comparators $C_5-C_n$ assume L Level, and the digital display circuit 14 causes the display device 15 to display "250" as shown in FIG. 3. When the proper shutter time output voltage of the exposure operational circuit 3 indicates a shutter time longer than the lowest controllable time (for example, 8 sec.) of the shutter, all of the comparators $C_1$-$C_n$ produces H-level outputs. On the basis of these H-level outputs, the digital display circuit 14 causes the display device 15 to display 8⁻  as shown in FIG. 4. "8" represents that the shutter time is not $\frac{1}{8}$ sec. but 8 sec., and  shows that the proper shutter time is longer than 8 sec.

Description will now be made of the display in the case of the shutter time manual setting mode. The change-over switch 7 selects one of the other terminals b, c, . . . . . than the terminal a. Assume that the change-over switch 7 has selected the terminal f. A voltage corresponding to the shutter time 1/125 sec. appears at this terminal f and therefore, the parallel comparison processing type A/D converter circuit, namely, the reference voltage generating circuit $F_1$ and the comparators $C_1$-$C_n$ produce outputs corresponding to that voltage and the digital display circuit 14 causes the display device 15 to display "125" as shown in FIG. 5. At this time, the switch 17 is in its OFF position and therefore, the digital display circuit 14 causes the display device 15 to display "M" while, at the same time, the outputs of the gates $G_5$ and $G_6$ become effective. Thus, the fixed point match type exposure display circuit for the shutter time manual setting mode is operated. That is, the differential circuit means D amplifies the difference between the manually set shutter time voltage $V_1$ applied to the follower amplifier $A_2$ and the proper shutter time voltage $V_2$ of the exposure operational circuit 3 applied to the follower amplifier $A_4$, with the voltage $V_0$ at the junction between the resistors $R_3$ and $R_4$ as the reference voltage. If the values of the resistance $R_a$-$R_d$ of the differential amplifier circuit are defined as
$Ra/Rb = Rd/Rc = G$, the output voltage of the differential amplifier circuit $A_5$ is $$V_{A5} = G(V_1 - V_2) + V_0 \qquad (1),$$

where $V_0$, $V_1$, $V_2$ and $V_{A5}$ are represented in the potential difference from the + side of the power source E. This output voltage $V_{A5}$ is compared with the voltage at the junction between the resistors $R_2$ and $R_3$ by the comparator $C_a$, with the potential at the junction between the resistors $R_1$ and $R_2$ by the comparator $C_b$, with the potential at the junction between the resistors $R_4$ and $R_5$ by the comparator $C_c$, and with the potential at the junction between the resistors $R_5$ and $R_6$ by the comparator $C_d$. Now, if the insensitive zone width change-over switch 16 is in its OFF position, the output of the inverter 18 is at L level and therefore, the gates $G_2$ and $G_4$ become closed. On the other hand, the gates $G_1$ and $G_3$ are open and after all, only the outputs of the comparators $C_a$ and $C_c$ become effective. The voltage across each resistor $R_2$-$R_n$ is $\Delta V$ and therefore, the reference input voltage of the comparator $C_a$ is $V_0 - \Delta V$ and the reference input voltage of the comparator $C_c$ is $V_0 + \Delta V$. The output of the comparator $C_a$ is at L level when $V_{A5} < V_0 - \Delta V$, and is at H level when $V_{A5} \geq V_0 - \Delta V$, and the output of the comparator $C_c$ is at H level when $V_{A5} \leq V_0 + \Delta V$, and is at L level when $V_{A5} > V_0 + \Delta V$.

Accordingly,
(1) when $V_{A5} = G(V_1 - V_2) + V_0 < V_0 - \Delta V$, namely, when the manual shutter time voltage $V_1$ is smaller by $\Delta V/G$ or more than the proper shutter time voltage $V_2$, the output of the comparator $C_a$ assumes L level and the output of the comparator $C_c$ assumes H level. These two outputs are applied through the gates $G_5$ and $G_6$ to the digital display circuit 14, which thus causes the display device 15 to display the mark  which shows that under-exposure takes place at the manually set shutter time 1/125 sec., as shown in FIG. 5.

(2) When $V_{A5} = G(V_1 - V_2) + V_0 > V_0 > V_0 + \Delta V$, namely, when $V_1$ is greater by $\Delta V/G$ or more than $V_2$, the output of the comparator $C_a$ assumes H level and the output of the comparator $C_c$ assumes L level. In the same manner as described above, on the basis of these two outputs, the digital display circuit 14 causes the display device 15 to display the mark  which shows that under-exposure takes place at the manually set shutter time, as shown in FIG. 6.

(3) When $V_0 - \Delta V \leq G(V_1 - V_2) + V_0 \leq V_0 + \Delta V$, namely, when the difference between $V_1$ and $V_2$ is within $\pm\Delta V/G$, both the outputs of the comparators $C_a$ and $C_c$ assume H level and, on the basis of these two outputs, the digital display circuit 14 causes the display device 15 to display the mark  which represents the proper exposure, as shown in FIG. 7. In this manner, the fixed point match type exposure display circuit has an insensitive zone width during the proper exposure of $2\Delta V/G$ and, even if $V_1$ is not in accord with $V_2$, if the difference therebetween is within $\pm\Delta V/G$, it displays it as a proper exposure. This insensitive zone width $2\Delta V/G$, in spite of its being produced by utilizing the reference voltages $V_0$, $V_0 + \Delta V$ and $V_0 - \Delta V$ of the parallel comparison processing type A/D converter circuit, is determined by a value G which in turn is determined by the resistors $R_a$-$R_d$ independently of the quantitizing width $\Delta V$ of this A/D converter circuit.

Thus, in the case of the shutter time manual setting mode, the fixed point match type exposure display which digitally displays whether the shutter time value thereof provides over-exposure or under-exposure or proper exposure is effected while, at the same time, the manually set shutter time value is displayed in the form of a digital value.

When the insensitive zone width change-over switch 16 is closed to enlarge the insensitive zone width, a ground potential is applied to the gates $G_1$ and $G_3$ and therefore, these are closed while, on the other hand, the output of the inverter 18 assumes H level and therefore, the gates $G_2$ and $G_4$ are opened. Accordingly, only the outputs of comparators $C_b$ and $C_d$ are applied to the digital display circuit 14 through the gates $G_2$, $G_4$, $G_5$, $G_6$. The voltage $V_0 - 2\Delta V$ at the junction between $R_1$ and $R_2$ and the voltage $V_0 + 2\Delta V$ at the junction between $R_5$ and $R_6$ and respectively applied to the reference input voltages of comparators $C_b$ and $C_d$ and after all, the insensitive zone width during the proper expsoure at this time becomes twice what has been previously mentioned, i.e., $4\Delta V/G$.

Generally, it is desirable that in the case of a film having a narrow latitude such as color positive film, the insensitive zone width be determined to the order of $\pm\frac{1}{4}Ev$ and that in the case of a film having a wide latitude such as color or monochromatic negative film, the insensitive zone width be determined to the order of $\pm\frac{1}{2}Ev$. Therefore, when the former film is used, the insensitive zone width change-over switch 16 may be opened, and when the latter film is used, the insensitive zone width change-over switch 16 may be closed. In FIG. 7, the fit condition of the exposure is indicated by displaying both of the marks ◢ and ◣ , but it may also be indicated by erasing these two marks that the exposure is in fit condition. FIG. 8 shows the circuit of the portion which effects the display change-over of the display circuit 14. Here, the number of the comparators $C_1$-$C_n$ of FIG. 1 is determined to sixteen. Accordingly, $C_n$ is $C_{16}$. Sampling gates $G_{11}$-$G_{26}$ comprising NAND gates have one input thereof connected to the output of each comparator $C_1$-$C_{16}$ and the other input thereof connected to a line $CL_2$ of sampling pulse. For the data latch, the outputs of the NAND gates $G_{11}$-$G_{26}$ are connected to the set inputs S of L trigger type RS flip-flops $FF_1$-$FF_{16}$. The reset terminals R of the RS flip-flops $FF_1$-$FF_{16}$ are connected to a reset line $CL_1$. A display sequence control circuits 50 generates a reset pulse generated at $CL_1$ for periodically refreshing the display to prevent flickering or the like of the display, a sampling pulse generated at $CL_2$, a blanking pulse $CL_3$ for erasing the display so that a wrong display is not effected during the time that reset and sampling are effected, and a control pulse for display column change-over signal or the like when the driving of the display is dynamic. The RS flip-flops $FF_1$-$FF_{16}$ are such that when the S terminals thereof are triggered, the Q terminals thereof assume H level and the $\bar{Q}$ terminals thereof assume L level and that when the R terminal thereof is triggered, the Q and $\bar{Q}$ terminals thereof are held in the reverse condition.

A drive circuit 51 includes a segment decoder circuit, a segment driving circuit, a column driving circuit, etc., and drives the display device 15 by the conditions of shutter time display input terminals $T_1$-$T_{15}$, mark ◢ display input terminal $T_0$, mark ◣ display input terminal $T_u$ and M display input terminal $T_M$. The shutter time display input terminals $T_1$, $T_2$, $T_3$, $T_4$, . . . . . $T_{15}$ respectively correspond to the shutter times 1/2000 sec., 1/1000 sec. 1/500 sec., 1/250 sec., . . . . . 8 sec., and $T_1$ and $T_{15}$ are respectively connected to the Q output of $FF_2$ and the Q output of $FF_{15}$, and $T_2$-$T_{14}$ are connected to the outputs of AND gates $G_{31}$, $G_{32}$, . . . . . controlled by the output conditions of $FF_2$-$FF_{15}$. When the inputs to the display input terminals $T_1$-$T_{15}$, $T_o$, $T_u$ and $T_M$ are at H level, the drive circuit 51 effects a display corresponding thereto.

Gates $G_{41}$, $G_{42}$ and $G_{45}$ change over the display control of mark ◢ by the automatic or the manual exposure mode. Likewise, gates $G_{43}$, $G_{44}$ and $G_{46}$ change over the display control of mark ◣ . The operation thereof is performed in the following manner.

Description will be made of the case of the automatic exposure mode, namely, the time when the switch 17 is in its closed position. When the switch 17 is in its closed position, the input of the gates $G_{42}$ and $G_{44}$ assume L level and therefore, the outputs of the gates $G_6$ and $G_5$ are neglected and the drive circuit 51 is affected in no way. On the other hand, the output of inverter $G_{47}$ is at H level and therefore, the conditions of the outputs of the gates $G_{41}$ and $G_{43}$ are determined by the outputs of the flip-flop $FF_1$ and $FF_{16}$, respectively.

Also, the M display input terminal $T_M$ of the drive circuit 51 is at L level and so, the M display is erased. Assuming that the exposure operational circuit 3 is generating a voltage corresponding to a shutter speed faster than 1/2000, then the outputs of the comparators $C_1$-$C_{16}$ are all at L level. Accordingly, even if the sampling pulses of the gates $G_{11}$-$G_{26}$ assume H level, the output of each gate is not varied and therefore, the flip-flops $FF_1$-$FF_{16}$ remain in reset condition and the $\bar{Q}$ output of the flip-flop $FF_1$ is at H level. And therefore, the output thereof renders the mark ◢ display input terminal $T_0$ into H level through the gates $G_{41}$ and $G_{45}$ to display mark ◢ and the 2▭▭▭ display input terminal $T_1$ connected to the Q output of the flip-flop $FF_2$ is at H level, thus effecting the display of 2▭▭▭. When the exposure operational circuit 3 is generating a voltage corresponding to the shutter speed 1/2000, only the output of the comparator $C_1$ is at H level and the outputs of the other comparators are all at L level. Accordingly, when that condition is sampled, only the flip-flop $FF_1$ is set and therefore, the Q output of the flip-flop $FF_1$ assumes L level and the mark ◢ display input terminal $T_O$ and assumes L level and thus, the mark ◢ is erased, but since the flip-flop $FF_2$ remains in reset condition, 2▭▭▭ display input terminal assumes H level, thus displaying 2▭▭▭. When the exposure operational circuit 3 is producing a voltage corresponding to the shutter time 1/1000, the outputs of the comparators $C_1$ and $C_2$ assume H level and accordingly, when that condition is sampled, the flip-flops $FF_1$ and $FF_2$ are reversed and as described previously, the mark ◢ display input terminal $T_0$ is at L level and so, the mark ◢ is not displayed, and the output of the gate $G_{31}$, namely, the 1▭▭▭ display input terminal $T_2$ assumes H level and thus, the display of 1▭▭▭ is effected. Likewise, when the exposure operational circuit generates voltages corresponding to longer shutter times, the number of the comparators generating H-level output increases to the comparators $C_1$, $C_2$, $C_3$, . . . . . and along therewith, the display input terminal corresponding to the shutter time thereof assumes H level, thus displaying that shutter time, and the mark ◢ remains erased. When the shutter time becomes longer than 8 sec., all the comparators $C_1$-$C_{16}$ generate H-level outputs and all of the flip-flops $FF_1$-$FF_{16}$ are reversed. By the reversal of the flip-flop $FF_{15}$, the 8 sec. display input terminal $T_{15}$ assumes H level to effect the display of 8⁻, and by the reversal of the flip-flop $FF_{16}$, the Q output thereof assumes H level and it renders the mark ◣ display input terminal $T_u$ into H level through the gates $G_{43}$ and $G_{46}$ and thus, the mark ◣ is also displayed.

In the case of the manual setting mode, namely, when the switch 17 is in its open position, the common input of the comparators $C_1$-$C_{16}$ is changed over from the output of the exposure operational circuit 3 to the output side of a manual shutter time setting circuit $r_1$ $R_2$ . . . . . . 20 and therefore, the outputs of the comparators $C_1$-$C_{16}$ are successively changed over in accordance with the manually set value, as previously described and along therewith, the display control of the manually set value is effected. Due to the switch 17 being in its open position, the input of inverter $G_{47}$ assumes H level and therefore, the output thereof assumes L level and the gates $G_{41}$ and $G_{43}$ are fixed to L-level outputs and thus, the control signals by the flip-flops $FF_1$ and $FF_{16}$ are neglected and the outputs of the gates $G_{42}$ and $G_{44}$ are determined by the output conditions of the gates $G_6$ and $G_5$ connected to the inputs of the gates $G_{42}$ and $G_{44}$, respectively. Also, the M display input terminal $T_M$ assumes H level, thus displaying the manual setting mode as the display of M. In the case of a proper exposure, as previously described, both the gates $G_5$ and $G_6$ are producing H-level outputs and both of the marks ◢ and ◣ display input terminals $T_O$ and $T_u$ assume H level, displaying both of the marks and ◣. When the exposure is under, the output of the gate $G_6$ is at L level and the output of the gate $G_5$ is at H level and so, the mark ◢ is erased and only the mark ◣ is displayed, thus indicating that the exposure is under. When the exposure is over, the output of the gate $G_6$ is at H level and the output of the gate $G_5$ is at L level and so, the mark ◢ is displayed while the mark ◣ is erased, thus indicating that the exposure is over.

FIG. 9 shows the timing of the reset pulse, sampling pulse and blanking pulse. As seen, during the time $t_0$–$t_1$, a line $CL_1$ is rendered into L-level output to reset the flip-flops $FF_1$–$FF_{16}$, and during the time $t_1$–$t_2$, a line $CL_2$ output is rendered into H level to effect sampling and cause the conditions of the comparators $C_1$–$C_{16}$ to be stored in the flip-flops $FF_1$–$FF_{16}$, and during the time $t_2$–$t_3$, a line $CL_3$ is rendered into H level to effect the display. During the time $t_0$–$t_2$, a line $CL_3$ is rendered into L level to erase the display so that a wrong display is not effected. The display is periodically refreshed with the time $t_0$–$t_3$ as a period, and a time of the order of 0.01–0.5s is usually chosen as such time.

In FIG. 8, both the marks ◢ and ◣ are displayed in the case of the proper exposure play during the manual setting mode, whereas it is also possible that both of these two marks are erased in the case of proper exposure and the mark ◢ is displayed in the case of over-exposure and the mark ◣ is displayed in the case of under-exposure. In that case, the output of the gate $G_5$ may be connected to the input of the gate $G_{42}$ through an inverter and the output of the gate $G_6$ may be connected to the input of the gate $G_{44}$ through an inverter.

FIG. 10 shows an aperture priority type automatic exposure single lens reflex camera according to another embodiment of the present invention.

Herein, the reference voltage generating circuit $F_2$ of the A/D converter circuit is utilized as the manual shutter time setting reference voltage generating circuit. That is, the circuit T of FIG. 1 is used also as the circuit $F_2$. A circuit 60 is an arrangement of the essential portions of the comparing means C of FIG. 1, namely, circuit elements $C_a$–$C_d$, $G_1$–$G_6$ and $A_2$–$A_4$. A current is supplied from a constant current source 70 to an operational amplifier $A_{10}$. A switch 80 is closed during the automatic exposure mode to short-circuit a resistor 90. Manual shutter time selecting terminals b′, c′, . . . are respectively connected to the junction between resistors $R_1$ and $R_2$, the junction between resistors $R_2$ and $R_3$, . . . The voltage at the junction between $R_1$ and $R_2$, the voltage at the junction between $R_2$ and $R_3$, . . . are respectively lower by $\Delta V/2$ than the voltages corresponding to the shutter times 1/2000 sec., 1/1000 sec., . . . and therefore, the voltages applied as 1/2000 sec., 1/1000 sec., . . . to the input terminal of comparator $C_o$ during the manual exposure mode must be the voltage at the junction between $R_1$ and $R_2$, the voltage at the junction between $R_2$ and $R_3$, . . . plus $\Delta V/2$.

The value of the resistors 90 and the current value of the constant current source 70 are determined so that when the switch 80 is open, the voltage drop of the resistor 90 is $\Delta V/2$. Thus, when the change-over switch 7 selects the manual shutter time selecting terminals b′, c′, . . . , the voltage at the junction between $R_1$ and $R_2$, the voltage at the junction between $R_2$ and $R_3$, . . . , plus $\Delta V/2$, are applied to the input terminal of the comparator $C_o$. The voltages of b′, c′, . . . so selected are shifted by a correction voltage $\Delta V/2$ produced by the constant current source 70, resistor 90 and operational amplifier $A_{10}$ and therefore, a voltage corresponding to a desired shutter time is applied to the comparator $C_o$.

During the automatic exposure mode, namely, when the change-over switch 7 has selected the automatic exposure terminal a′, the correction voltage $\Delta V/2$ is unnecessary and so, the switch 80 is closed and the output of follower amplifier $A_1$ is intactly applied to the comparator $C_o$.

Also, in the present embodiment, the display of the fixed point match when a shutter time is manually selected is accomplished by closing and opening the insensitive zone width change-over switch 16 to thereby select the outputs of the comparators $C_a$–$C_d$ are arbitrarily change over the insensitive zone width, but instead of doing so, if the comparators $C_a$, $C_b$, $C_c$ and $C_d$ are connected to the digital display circuit 14 so that (1) when the exposure is over as compared with the wider insensitive zone width, only the mark ◢ is continuously displayed, (2) when the exposure is in fit condition in the wider insensitive zone width but is over as compared with the narrower insensitive zone width, namely, when the exposure is a proper exposure for the film of a wide latitude but the exposure is an over-exposure for the film of a narrow latitude, the mark ◣ remains extinct while the mark ◢ is turned on and off, or the mark ◣ is continuously displayed while the mark ◢ is turned on and off, or the mark ◢ is continuously displayed while the manually selected shutter time display value is turned on and off, and (3) when the exposure is fit in the narrower insensitive zone width, the marks ◢ and ◣ and the shutter time value are continuously displayed or the marks ◢ and ◣ are erased while only the shutter time value is displayed and when the exposure further changes toward the under side, a display reverse in relation to the aforementioned display when the exposure changes toward the over side is effected, then any desired insensitive zone width can be properly used even if the insensitive zone width change-over switch is not changed over.

Also, in the present invention, the common input of the comparators $C_1$–$C_n$ of the shutter time displaying A/D converter portion is changed over to the output voltage of the metering operational circuit or a voltage corresponding to a manually selected shutter time value by the shutter time change-over switch 7, but this may normally be connected to the output of follower amplifier $A_1$. At such time, the shutter time displayed is always the proper shutter time value by the output of the exposure operational circuit 3.

Also, a display element for indicating whether the manually set shutter time value provides over-exposure or under-exposure or proper exposure and a display element for displaying, in several stages, for example, in the fashion of $\frac{1}{2}$ $E_v$, 1 $E_v$ and $1\frac{1}{2}$ $E_v$, how much the manually set shutter time value is deviated from the proper shutter time value, may the provided separately from each other. Further, the illustrated embodiment is an example in which the shutter time is controlled, whereas it is also possible to make such a design that the aperture value is automatically or manually controlled and it is displayed as a digital value.

The digital exposure value display device mentioned in the present specification includes not only devices which display the exposure value such as shutter time actually in a numerical value, but also devices of the type in which numerals or the like indicative of the shutter times to be displayed are arranged on a line in advance and the shutter time values are selected and displayed on the basis of the output of an A/D converter circuit.

In the device of the present invention, a single reference voltage generating circuit can be used for two different purposes and this leads to a lower cost of manufacture.

I claim:

1. A camera having a digital exposure display device ($C_1$-$C_n$, 14, 15) for comparing a voltage associated with an exposure value such as a shutter time value or an aperture value obtained from exposure operating means (P, 1, 2, 3, 4, 5, 6, $A_1$) with a plurality of reference voltages produced by a reference voltage generating circuit ($F_1$) and thereby converting the exposure value into a digital signal and digitally displaying said exposure value on the basis of said digital signal, said camera further having a digital fixed point match type exposure display device comprising:

an exposure value setting circuit (T) for generating a voltage associated with a manually set exposure value;

differential amplifier circuit means (D) for generating a voltage including a voltage corresponding to the difference between the voltage of said exposure value setting circuit (T) and the voltage obtained from said exposure operating means;

forming means ($l_1$-$l_4$) for forming a first comparison voltage and a second comparison voltage greater than said first comparison voltage by using the output voltage of said reference voltage generating circuit;

comparing means (C) for comparing the comparison voltage of said forming means ($l_1$-$l_4$) with the output of said differential circuit means (D) and producing a first signal variable in condition depending on whether said output is smaller or greater than said first comparison voltage and a second signal variable in condition depending on whether said output is greater or smaller than said second comparison voltage; and display means (14, 15) operative to effect a display based on said first and second signals of said comparing means.

2. A camera according to claim 1, wherein said forming means ($l_1$-$l_4$) selects as a first comparison voltage a reference voltage smaller by a predetermined voltage than a standard voltage ($V_0$) selected from among the reference voltages of said reference voltage generating circuit ($F_1$) and as a second comparison voltage a reference voltage greater by a predetermined voltage than said standard voltage ($V_0$), and said differential circuit means (D) has an adder circuit ($A_3$) for said differential circuit means to produce a voltage comprising a voltage corresponding to the difference between the voltage of said exposure value setting circuit (T) and the voltage obtained from said exposure operating means, plus said standard voltage.

3. A camera according to claim 2, wherein said adder circuit ($A_3$) adds said standard voltage to the voltage of said exposure value setting circuit (T).

4. A camera according to claim 2, wherein said forming means selects a third comparison voltage smaller by a predetermined voltage than said first comparison voltage and a fourth comparison voltage greater by a predetermined voltage than said second comparison voltage from among the reference voltages of said reference voltage generating circuit ($F_1$) and applies the third and fourth comparison voltages to said comparing means, said comparing means produces a third signal variable in condition depending on whether the output of said differential circuit means (D) is greater or smaller than said third comparison voltage and further puts out a fourth signal variable in condition depending on whether said output is smaller or greater than said fourth comparison voltage, and said display means (14, 15) further effects a display based on the third and fourth signals of said comparing means.

5. A camera according to claim 1, wherein said exposure value setting circuit (T) has selecting means (7 and $A_{10}$ in FIG. 10) for selectively producing the reference voltages of said reference voltage generating circuit ($F_1$).

6. A camera having a digital exposure display device ($C_1$-$C_n$, 14, 15) for comparing a voltage associated with an exposure value such as a shutter time or an aperture value obtained from exposure operating means (P, 1, 2, 3, $A_1$) with a plurality of reference voltages produced by a reference voltage generating circuit ($F_2$) and thereby converting said voltage into a digital signal and digitally displaying said exposure value on the basis of said digital signal, said camera further having an exposure control circuit ($C_o$, 8) for controlling the exposure in accordance with an input voltage, and a manual exposure setting device comprising:

output means for producing the plurality of reference voltages generated by said reference voltage generating circuit ($F_2$); and selecting means for selecting any one of the voltages produced by said output means and applying it to said exposure control circuit.

7. A camera according to claim 6, wherein said selecting means is further designed so as to be able to select the voltage from said exposure operating means and apply it to said exposure control circuit, said manual exposure setting circuit further has level shift means ($A_{10}$, 90, 80), and said level shift means inparts different level shift voltage to the output voltage of said output means and the output voltage of said exposure operating means.

8. A camera according to claim 6, further having a digital fixed point match type exposure display device comprising:

a differential amplifier circuit means (D) for producing a voltage including a voltage corresponding to the difference between the voltage selected by said selecting means (7) and the voltage obtained from said exposure operating means;

forming means ($l_1$-$l_4$) for forming a first comparison voltage and a second comparison voltage greater than said first comparison voltage by using the output voltage of said reference voltage generating circuit;

comparing means (C) for comparing the comparison voltage of said forming means ($l_1$-$l_4$) with the output of said differential circuit means (D) and producing a first signal variable in condition depending on whether said output is smaller or greater than said first comparison voltage and a second signal variable in condition depending on whether said output is greater or smaller than said second comparison voltage; and display means (14, 15) operative to effect a display based on said first and second signals of said comparing means.

9. A camera according to claim 8, wherein said forming means ($l_1$–$l_4$) selects as a first comparison voltage a reference voltage smaller by a predetermined voltage ($\Delta V$) than a standard voltage ($V_o$) selected from among the reference voltages of said reference voltage generating circuit ($F_1$) and as a second comparison voltage a reference voltage greater by a predetermined voltage ($\Delta V$) than said standard voltage ($V_o$), and said differential circuit means (D) has an adder circuit ($A_3$) for said differential circuit means to produce a voltage comprising a voltage corresponding to the difference between the voltage of said exposure value setting circuit (T) and the voltage obtained from said exposure operating means, plus said standard voltage.

* * * * *